United States Patent
Ropel et al.

(10) Patent No.: US 11,922,741 B2
(45) Date of Patent: Mar. 5, 2024

(54) SECURE INSTALLATION OF APPROVED PARTS USING BLOCKCHAIN

(71) Applicant: Volvo Car Corporation, Gothenburg (SE)

(72) Inventors: Andreas Martin Viktor Ropel, Gothenburg (SE); Kjell Henrik Eklund, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 864 days.

(21) Appl. No.: 16/435,180

(22) Filed: Jun. 7, 2019

(65) Prior Publication Data
US 2020/0388091 A1  Dec. 10, 2020

(51) Int. Cl.
*G07C 5/08* (2006.01)
*H04L 9/06* (2006.01)

(52) U.S. Cl.
CPC .......... *G07C 5/0841* (2013.01); *H04L 9/0637* (2013.01)

(58) Field of Classification Search
None
See application file for complete search history.

(56) References Cited

U.S. PATENT DOCUMENTS

| | | |
|---|---|---|
| 7,177,553 B2 | 2/2007 | Ono |
| 2008/0117036 A1 | 5/2008 | Kenny et al. |
| 2010/0013594 A1* | 1/2010 | Komine ............. G05B 19/0428 340/5.8 |
| 2012/0123611 A1* | 5/2012 | Grasso .................... B60R 25/00 701/1 |
| 2016/0129736 A1* | 5/2016 | Peine ....................... G01B 7/30 701/32.3 |
| 2017/0046652 A1 | 2/2017 | Haldenby et al. |
| 2018/0225651 A1* | 8/2018 | Stone .................... H04L 9/3239 |
| 2019/0042726 A1 | 2/2019 | Unagami et al. |
| 2019/0340269 A1* | 11/2019 | Biernat .................. G06F 16/27 |
| 2020/0143606 A1* | 5/2020 | Hoffmann ............. H04L 9/3239 |
| 2020/0167459 A1* | 5/2020 | Viale ...................... G06F 21/64 |
| 2020/0267187 A1* | 8/2020 | Singh .................... H04L 63/123 |

FOREIGN PATENT DOCUMENTS

| | | | |
|---|---|---|---|
| CN | 107730279 A | 2/2018 | |
| EP | 1159551 B1 * | 10/2003 | ......... F16H 57/0006 |
| KR | 101796690 B1 * | 11/2017 | |

OTHER PUBLICATIONS

Machine translation of KR 101796690 B1 (Year: 2017).*

* cited by examiner

*Primary Examiner* — Anne Marie Antonucci
*Assistant Examiner* — Kyle S Park
(74) *Attorney, Agent, or Firm* — Shumaker & Sieffert, P.A.

(57) ABSTRACT

In general, techniques are described by which provide verification of parts installed to a device. A device comprising one or more sensors one or more processors implemented in circuitry may be configured to perform the techniques herein. The one or more processors are in communication with the one or more sensors and are configured to determine, in response to detecting an installation of a component for the device, an operating characteristic of the component measured by the one or more sensors. The one or more processors are further configured to verify, based at least in part on a comparison of the operating characteristic of the component and an approved operating characteristic for the component stored in a blockchain, that the component is an approved component for the device.

18 Claims, 6 Drawing Sheets

SECURE INSTALLATION OF APPROVED PARTS USING BLOCKCHAIN

TECHNICAL FIELD

This disclosure relates to vehicles and, more specifically, diagnostics for components of vehicles.

BACKGROUND

Vehicles, in general, are quite customizable with owners being able to install after-market products in place of, or in addition to, factory installed components. Furthermore, through the general maintenance of the vehicle as the vehicle ages, parts may have to be replaced. However, owners may not be knowledgeable with regards to the inner workings of the vehicle, and not every component may be compatible with the vehicle as a whole. Owners may also opt to have third-party repair shops install and/or replace parts in the vehicle, but the user may be fully unaware as to whether the parts being installed in their vehicle are quality, authentic parts, or if the products are of a lower, unapproved quality that could harm the vehicle during normal operation.

SUMMARY

In general, techniques are described for enabling a vehicle to perform an analysis on newly installed parts to determine if the newly installed parts are valid or have passed a quality test that has been certified or approved by the original manufacturer. This verification process includes using sensors to monitor and detect various operating characteristics of the newly installed part in response to detecting that the part was installed. The vehicle may compare one or more of the detected operating characteristics to approved operating characteristics or an approved range of operating characteristics for that type of part. To ensure the immutability of the approved operating characteristics, the approved operating characteristics for the various types of components may be stored throughout a network of devices in a blockchain. By verifying whether approved parts were installed in the vehicle, the techniques may identify instances where parts that may of inferior quality or may be harmful to the safe and efficient operation of the vehicle were installed, which may improve the operation of the vehicle itself.

In one example, aspects of the techniques are directed to a device that includes one or more sensors and one or more processors implemented in circuitry. The one or more processors are in communication with the one or more sensors and are configured to determine, in response to detecting an installation of a component for the device, an operating characteristic of the component measured by the one or more sensors. The one or more processors are further configured to verify, based at least in part on a comparison of the operating characteristic of the component and an approved operating characteristic for the component stored in a blockchain, that the component is an approved component for the device.

In another example, aspects of the techniques are directed to a device that includes means for determining, in response to detecting an installation of a component for the device, an operating characteristic of the component. The device further includes means for verifying, based at least in part on a comparison of the operating characteristic of the component and an approved operating characteristic for the component stored in a blockchain, that the component is an approved component for the device.

In another example, aspects of the techniques are directed to a method that includes determining, by a device, and in response to detecting an installation of a component for the device, an operating characteristic of the component. The method further includes verifying, by the device, based at least in part on a comparison of the operating characteristic of the component and an approved operating characteristic for the component stored in a blockchain, that the component is an approved component for the device.

In another example, aspects of the techniques are directed to a non-transitory computer-readable medium having stored thereon instructions that, when executed, cause one or more processors of a device to determine, in response to detecting an installation of a component for the device, an operating characteristic of the component measured by one or more sensors. The instructions, when executed, further cause the one or more processors of the device to verify, based at least in part on a comparison of the operating characteristic of the component and an approved operating characteristic for the component stored in a blockchain, that the component is an approved component for the device.

The details of one or more aspects of the techniques are set forth in the accompanying drawings and the description below. Other features, objects, and advantages of these techniques will be apparent from the description and drawings, and from the claims.

DETAILED DESCRIPTION

Figure 1:
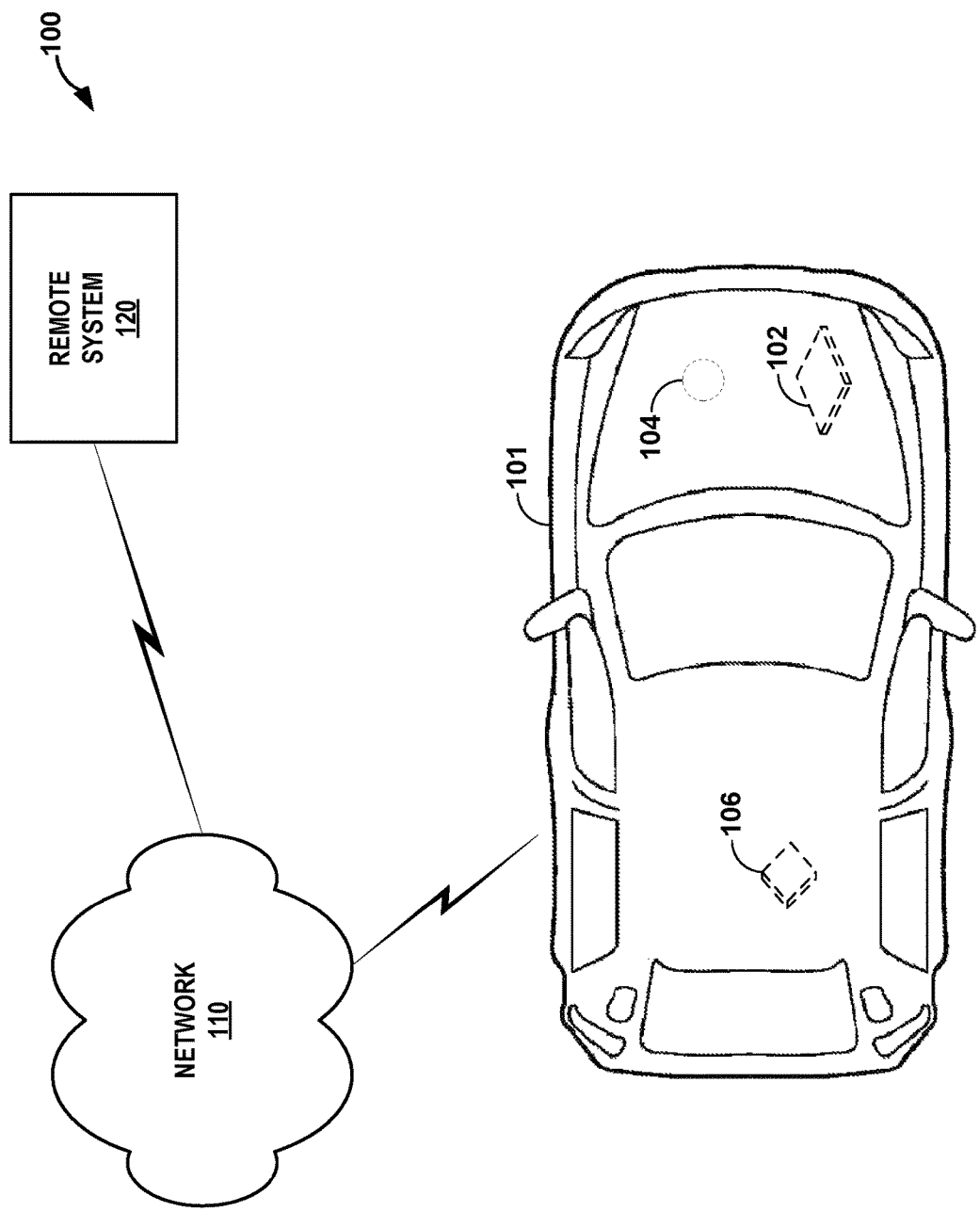
FIG. 1 is a diagram illustrating an example system configured to perform various aspects of the component verification techniques described in this disclosure.

FIG. 1 is a diagram illustrating an example system 100 configured to perform various aspects of the component verification techniques described in this disclosure. As shown in the example of FIG. 1, system 100 includes a vehicle 101, a network 110, and a remote system 120.

Although shown as an automobile in the example of FIG. 1, vehicle 101 may represent any type of vehicle, including an automobile, a truck, farm equipment, a motorcycle, a bike (including electronic bikes), a scooter, construction equipment, a semi-truck, an airplane, a helicopter, a military vehicle, or any other type of vehicle capable of implementing various aspects of the machine learning based vehicle diagnostic techniques described in this disclosure.

Network 110 may represent any type of network by which communication between vehicle 101 and remote system 120 may be accomplished. Network 110 may represent a public network (e.g., the Internet), a private network, a cellular network (including various cellular data network, such as a 3G, 4G and/or 5G network), a personal area network, or combinations thereof.

Remote system 120 may represent one or more devices configured to communicate via network 110 with vehicle 101. Remote system 120 may communicate via network 110 with vehicle 101 to monitor or otherwise retrieve diagnostic data concerning one or more components of vehicle 101, such as an engine, an anti-lock braking system (ABS), a traction control (TC) system, an electronic stability control (ESC) system, brake system, heads-up display system, coolant system, navigation system, infotainment system, or any other type of component or system integrated into vehicle 101 or in communication with vehicle 101. Remote system 120 may, in addition or as an alternative to monitoring vehicle 101, communicate with vehicle 101 to update one or more of the above noted types of components of vehicle 101. In still other instances, in addition or as an alternative to monitoring vehicle 101 and/or updating components of vehicle 101, remote system 120 may include one or more nodes of a peer-to-peer network that each store one or more blockchains, each blockchain including at least an indication of approved operating characteristics for the various types of components included in vehicle 101.

As further shown in the example of FIG. 1, vehicle 101 includes a computing device 102, one or more sensors 104, and one or more components (represented generally by component 106). Computing device 102, sensors 104, and component 106 are shown in the example of FIG. 1 using dashed lines to denote that computing device 102, sensors 104, and component 106 may not be visible or are otherwise integrated within vehicle 101.

Computing device 102 may include one or more electronic control unit (ECUs) and a computing device. For example, computing device 102 may include an ECU configured to control component 106, an ECU configured to control the ABS (which may also control TC), an ECU configured to control the ECS system, and a main ECU acting as the computing device to direct operation of all of the systems (including those not listed in this example). Generally, an ECU includes a microcontroller, and memory (such as one or more of static random access memory—SRAM, electrically erasable programmable read-only memory—EEPROM, and Flash memory), digital and/or analog inputs, digital and/or analog outputs (such as relay drivers, H bridge drivers, injector drivers, and logic outputs).

In some examples, rather than utilize an ECU as the computing device, computing device 102 may include a relatively more powerful processor (compared to the microcontroller) configured to execute instructions or other forms of software to perform various aspects of the machine learning based vehicle diagnostic techniques described in this disclosure. The processor may represent one or more of fixed function, programmable, or combinations thereof, such as microprocessors, digital signal processors (DSPs), application specific integrated circuits (ASICs), field programmable gate arrays (FPGAs), discrete logic, software, hardware, firmware or any combinations thereof. When the techniques are implemented partially in software, computing device 102 may store instructions for the software in a suitable, non-transitory computer-readable medium and execute the instructions in hardware using one or more processors to perform the techniques of this disclosure. A device including computing device 102 may comprise an integrated circuit, and/or a microprocessor.

For purposes of illustration, computing device 102 is assumed to represent a processor communicatively coupled to one or more ECU responsible for controlling operation of component 106. Sensors 104 may be communicatively coupled to computing device 102 and may be configured to measure various operating characteristics of component 106 of vehicle 101. For instance, sensors 104 may be configured to obtain data indicative of accelerometer data for component 106, accelerometer data for vehicle 101, an operating temperature for component 106, an operating temperature for vehicle 101, a measurement of distance traveled by vehicle 101, a sound of component 106 during operation, a performance metric of component 106, a rotational frequency of component 106, a vibration frequency of component 106, exhaust values of vehicle 101, a software characteristic of component 106, a software characteristic of vehicle 101, or a torque generated by component 106.

Component 106 may be representative of any system or sub-system in vehicle 101 that may have updates applied to software or firmware of the component, or any part of vehicle 101 that may be replaced during the operational lifetime of vehicle 101. For instance, component 106 may be the entirety of, a portion of, or a fluid inside of the engine, the ABS, the TC system, the ESC system, the brake system, the heads-up display system, the coolant system, the navigation system, the infotainment system, the powertrain, the exhaust system, the fuel bus, the gearbox, the shock absorbers, the wheels, or any other operational component of vehicle 101.

In accordance with various aspects of the techniques described in this disclosure, computing device 102 may detect that component 106 is newly installed in vehicle 101, either through the replacement of an old version of a component or an addition of a new component to vehicle 101. Computing device 102 may utilize blockchain and peer-to-peer communication, in combination with sensors 104, to verify whether component 106 installed in vehicle 101 is factory-approved or explicitly disapproved for use in vehicle 101. The use of blockchain technology ensures that the data is immutable and valid throughout the vehicle life-cycle.

Every piece of hardware (e.g., springs or any other physical component that contributes to the operation of vehicle 101) or software (e.g., engine software or any other software or firmware that is installed on a physical component of vehicle 101) has a particular set of characteristics after development. For approved components, each type of component could have a particular characteristic value or have a particular range of approved values for a variety of characteristics, and this characteristic value or range of values may vary based on the particular model of vehicle 101. These values (and/or range of values) reflect parts that are deemed to be of a certain level of quality by the original equipment manufacturer, such as after a certification process. For a particular model, the characteristics of each part should have be within the range for quality parts, otherwise the operation of vehicle 101 may become unsafe, inefficient, or at risk of damaging other components in vehicle 101. The characteristic (or range) for each component may be derived from data obtained during the development phase or tuning phase of the model in general. This characteristic can be stored as a fingerprint, of sorts, which identifies the part made for a specific product.

This characteristic and/or range is stored on a blockchain in a secured area i.e. at least in vehicle 101 and one or more other nodes in network 110 and remote system 120. When computing device 102 detects that component 106 is in use for the first time, either during a driving cycle (e.g., from the instant vehicle 101 is powered on until the instant vehicle 101 is powered completely off) or in general (e.g., after the part is newly installed and vehicle 101 is powered on for the first time after the installation), the characteristics of component 106 could be measured by sensors 104 in order to confirm the operating characteristics of component 106. Computing device 102 can compare the operating characteristics of component 106 to the approved characteristics/ranges stored on the blockchain for a component having a same type as component 106 (e.g., characteristics for a quality crankshaft when component 106 is a crankshaft, characteristics for a quality gear when component 106 is a gear, etc.) in order to verify that the hardware or software of component 106 is genuine (e.g., verified for use in the particular model of vehicle 101, or of a quality that has been certified by the original equipment manufacturer). If component 106 is genuine, indicating that the quality of the component is high, then vehicle 101 may refrain from performing further checks within the current driving cycle or lifecycle of component 106.

If the hardware or software of component 106 have another characteristic when checked against the blockchain, then it may be assumed that component 106 consists of low quality hardware or software and a warning shall be issued, either to a user of vehicle 101 or to the manufacturer of vehicle 101. This warning may include the particular part that is improper, the issue resulting from such part being improper, and/or an action that should be taken in order to install hardware or software that is of a quality that has been certified by the original equipment manufacturer.

Computing device 102 determines, in response to detecting an installation of component 106 for vehicle 101, an operating characteristic of component 106 measured by sensors 104. Computing device 102 then verifies, based at least in part on a comparison of the operating characteristic of the component and an approved operating characteristic for components having the same type as the type of the installed component stored in a blockchain, that the component is an approved component for the device.

A blockchain is a series of blocks that are linked to one another using cryptography, such as a hash function. Each block of the blockchain includes a hashed version of the previous block of the blockchain, a timestamp of the update to the blockchain, the new information for the blockchain, and, potentially, additional information about the transaction adding the new information, such as a user identification or some other sort of metadata. The initial instance of a new transaction is issued from some node in the system and to another node in the system. If the issuer node is connected to each other node in the system, the issuer node may distribute the update to each other node in the system, enabling every node in the system to maintain an immutable, up-to-date version of the blockchain upon the blockchain being updated. In other instances, such as where the issuer node is not connected to other nodes in the system, a peer-to-peer network may be utilized to distribute the blocks throughout the nodes participating in the blockchain storage system. By including a hashed version of the previous block and a timestamp for each transaction in each block of the blockchain, nodes in the peer-to-peer network need not explicitly receive each block in the system, but may always ensure the node is storing the most up-to-date version of the blockchain possible through comparison of the timestamp in the most recent block stored on the node to a timestamp in the most recent block stored on another node in the peer-to-peer network.

Furthermore, each node may individually verify that any updates to the blockchain are valid using the hashed version of the previous block that must be included in any transaction to the blockchain. For instance, if a node determines that the hashed portion of a new transaction does, in fact, include the most recent block of the blockchain stored in the node, then the node may approve the transaction as a valid transaction. Conversely, if the node determines that the hashed portion of the new transaction does not include the most recent block of the blockchain stored in the node, then the node may determine the transaction is invalid. Furthermore, since each block includes a hash of the previous block, a most recent block of the blockchain would include, in order, a history of every valid transaction in the blockchain. As such, if the node determines that various details of the history of blocks hashed into the most recent block is incorrect, the node may determine that the new transaction is invalid. Furthermore, if the node determines that the timestamp information for the new block is incompatible with the most recent block in the blockchain, such as if the timestamp in the transaction is before a timestamp of the most recent block in the blockchain stored on the node, the node will determine that the transaction is invalid.

In this manner, blockchain provides a reliable, immutable system to maintain updated records of what the issuer node has deemed to be acceptable characteristics of parts installed or added on to vehicle 101. New parts, developed either by the original equipment manufacturer or by approved third-party sellers, may be released into market on an inconsistent basis. However, by enabling an issuer node to push updates to nodes of a peer-to-peer network via blockchain transactions, vehicle 101 may consistently maintain a record of which characteristics are representative of approved parts. Installation of disapproved parts may result in unsafe or inefficient operation of vehicle 101. By ensuring the correct installation of valid parts in vehicle 101, vehicle 101 may continue operating effectively.

Figure 2:
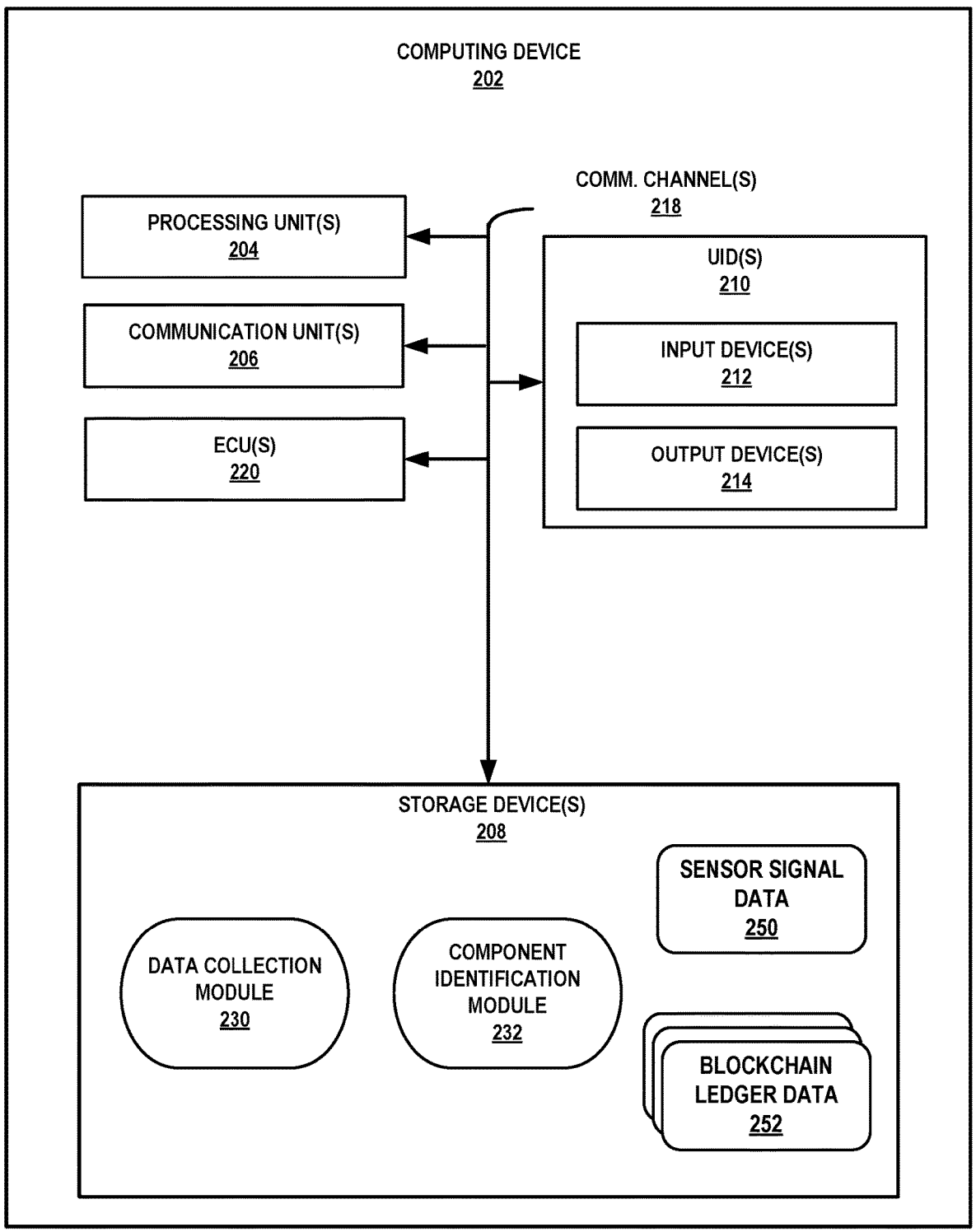
FIG. 2 is a block diagram illustrating an example computing system configured to perform various aspects of the component verification techniques described in this disclosure.

FIG. 2 is a block diagram illustrating an example computing device 202 configured to perform various aspects of the component verification techniques described in this disclosure. Computing device 202 represents an example of computing device 102 described above with reference to FIG. 1. As illustrated in FIG. 2, computing device 202 includes at least one processing unit 204, at least one communication unit 206, at least one storage device 208, at least one user interface device (UID) 210, at least one communication channel 218, and one or more ECUs 220. FIG. 2 illustrates only one particular example of computing device 202, and many other examples of computing device 202 may be used in other instances and may include a subset of the components included in example computing device 202 or may include additional components not shown in FIG. 2.

In one example, computing device 202 may be, or may be incorporated in, any electronic computing device with components that may be replaced, added to, or removed from the device itself. In some examples, computing device 202 may be, or may be incorporated in, a motor vehicle, such as the example described in FIG. 1. In other examples, computing device 202 may be dome other device, such as a smartphone, a computerized watch (e.g., a smart watch), computerized eyewear, computerized headwear, other types of wearable computing devices, a tablet computer, a personal digital assistant (PDA), a laptop computer, a desktop computer, a gaming system, a media player, an e-book reader, a television platform, an automobile navigation system, a digital camera, or any other type of mobile and/or non-mobile computing device that is configured to perform a component verification operation as described herein.

Processing units 204 may represent a unit implemented as fixed-function processing circuits, programmable processing circuits, or a combination thereof. Fixed-function circuits refer to circuits that provide particular functionality and are pre-set on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function processing circuits perform are generally immutable. In some examples, the one or more of the units may be distinct circuit blocks (fixed-function or programmable), and in some examples, the one or more units may be integrated circuits.

Communication units 206 may represent a unit configured to communicate with one or more other computing devices by transmitting and/or receiving data. Communications units 206 may include wired and/or wireless communication units. Examples of wired communication units 206 include Universal Serial Bus (USB) transceivers. Examples of wireless communication units 206 include GPS radios, cellular (e.g., LTE) radios, Bluetooth™ radios, WiFi™ radios, or any other wireless radios.

In some examples, storage device 208 may represent a unit configure to store one or more modules, such as data collection module 230 and component identification module 232 shown in FIG. 2. Storage device 208 may be a temporary memory, meaning that a primary purpose of storage device 208 is not long-term storage. Storage device 208 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage device 208 may include one or more non-transitory computer-readable storage devices. Storage device 208 may be configured to store larger amounts of information than typically stored by volatile memory. Storage device 208 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage device 208 may store program instructions and/or information (e.g., data) that, when executed, cause processing unit 204 to perform the techniques of this disclosure. For example, storage device 208 may include data or information associated with one or more modules 230 and 232.

User interface devices (UID) 210 may represent a unit configured to enable a user to interact with computing device 202. UIDs 210 may include one or more input devices 212 and/or more output devices 214. Examples of input devices 212 include display devices, keyboards, pointing devices (such as a mouse or digital pen), microphones, physical buttons or knobs, among others. Examples of output devices 214 include display devices and speakers, among others. Display devices may include touchscreens (e.g., capacitive or resistive). Example display devices include liquid crystal displays (LCD), light emitting diode (LED) displays, organic light-emitting diode (OLED) displays, e-ink, or other device configured to display information to a user.

ECUs 220 may represent one or more electronic control units configured to control electronics and various subsystems of vehicle 101, such as the above noted ABS and ESC system. ECUs 220 may each be implemented as an embedded system, which may include a microcontroller or other type of processor, memory, inputs, and outputs as noted above. ECUs 220 may interface with one or more of sensors 104 (FIG. 1) in the manner described above in support of the electronics and/or subsystems.

Communication channels 218 may represent a unit configured to interconnect each of components 204, 206, 208, 210, and/or 220 for inter-component communications (physically, communicatively, and/or operatively). In some examples, communication channels 218 may include a system bus, a network connection, one or more inter-process communication data structures, or any other components for communicating data.

As further shown in the example of FIG. 2, storage device 208 stores data collection module 230 and component identification module 232. Processing units 204 may interface with storage device 208 to retrieve one or more instructions of data collection module 230 that, when executed, cause processing units 204 to perform operations directed to collection of sensor signal data 250 from ECUs 220 via communication channels 218. Similarly, processing units 204 may interface with storage device 208 to retrieve one or more instructions of component identification module 232 that, when executed, cause processing units 204 to perform operations directed to validating, based on sensor signal data 250, one or more components of a computing system that includes computing device 202 (e.g., vehicle 101) upon detection of the component's installation in vehicle 101, as discussed above. Reference to modules 230 and 232 performing various operations should be understood to refer to processing units 204 performing the various operations discussed with respect to each of modules 230 and 232.

In any event, data collection module 230 may execute one or more communication protocols, such as the above noted controller area network (CAN) communication protocol, to interface with ECUs 220 and thereby indirectly interface with the associated ones of sensors 104. In some examples, data collection module 230 may interface directly with sensors 104 to collect sensor signal data 250. Sensor signal data 250 may represent data indicative of sensor signals output by sensors 104. Data collection module 230 may store sensor signal data 250 to storage device 208.

Data collection module 230 may also maintain one or more instances of blockchain ledger data 252. For instance, in some examples, a single blockchain (and a single instance of blockchain ledger data 252) may store all information pertinent to each component that may be installed or added into a computing system that includes computing device 202. In other examples, a different blockchain (and different blockchain ledger data 252) may be used to store approved characteristics for each component that may be installed or added into a computing system that includes computing device 202. In other instances, a blockchain storing explicitly disapproved characteristics may also be stored in blockchain ledger data 252. Data collection module 230 may leverage communication units 206 to communicate with other nodes of a peer-to-peer network to maintain up-to-date approved component characteristics in blockchain ledger data 252. After sufficient data is collected, data collection module 230 may invoke component identification module 232.

For the purposes of this example with regards to FIG. 2, computing device 202 is a component of a larger system of components, such as vehicle 101, that detects the installation of other components outside of computing device 202 (e.g., component 106) using information from sensors located outside of computing device 202 (e.g., sensors 104). However, in other instances, computing device 202 may itself include additional components that may be replaced or otherwise installed into computing device 202. In such instances, computing device 202 may itself include sensors to measure the various operating characteristics of the components included in computing device 202.

In accordance with the techniques described herein, component identification module 232 may determine, in response to detecting an installation of component 106 for a system (e.g., vehicle 101), an operating characteristic of component 106. Component identification module 232 may determine the operating characteristic based on sensor signal data 250 obtained by data collection module 230 from sensors 104. Component identification module 232 may then verify, based at least in part on a comparison of the operating characteristic of component 106 and an approved operating characteristic for that type of component stored in blockchain ledger data 252, that component 106 is an approved component for the system.

In various examples, the operating characteristic may be any number of characteristics, potentially dependent on the specific component installed in the system. In some instances, the operating component may be accelerometer data for the component. For example, various portions of the engine (e.g., pistons, cranks, flywheels, the crankshaft, the oil, etc.), shock absorbers, or any other moving part inside the vehicle may be the particular component replaced or otherwise installed in the system. For the particular model of vehicle, the original equipment manufacturer may test various acceleration scenarios for each component of the engine to create a model for how each part inside the engine will accelerate and decelerate during normal operation when each part in the engine is installed correctly with a valid part. During the first driving cycle after the new component in the engine is detected, sensors 104 may monitor the newly installed component of the engine, sending the acceleration information and the state of the vehicle when the acceleration was measured (e.g., the revolutions per minute (RPMs) of the vehicle's crankshaft, the gear the engine is in, the percentage of depression of the gas pedal, etc.) to data collection module 230. Component identification module 232 may compare this acceleration and state information to approved acceleration/state combinations stored in the blockchain to verify that the component in the engine is behaving as expected. If component identification module 232 determines that the acceleration of the component is valid given the state of the vehicle, component identification module 232 may determine that the component is a valid component. Otherwise, component identification module 232 may determine that either the component is an invalid component or that the component was improperly installed.

In another instance, the operating characteristic may include accelerometer data for the system. For example, various portions of the engine (e.g., pistons, cranks, flywheels, the crankshaft, the oil, etc.), the wheels, the axles, the gas pedal, or any other component that may influence the speed and acceleration of the vehicle as a whole may be the particular component replaced or otherwise installed in the system. For the particular model of vehicle, the original equipment manufacturer may test various acceleration scenarios to create a model for how the vehicle itself will accelerate and decelerate during normal operation when each component of the vehicle is installed correctly with a valid part. During the first driving cycle after the new component is detected, sensors 104 may monitor the acceleration of the vehicle throughout the driving cycle, sending the acceleration information and the state of the vehicle when the acceleration was measured (e.g., the RPMs of the vehicle's crankshaft, the gear the engine is in, the percentage of depression of the gas pedal, etc.) to data collection module 230. Component identification module 232 may compare this acceleration and state information to approved acceleration/state combinations stored in the blockchain to verify that the vehicle is behaving as expected after the installation of the new component. If component identification module 232 determines that the acceleration of the vehicle is valid given the state of the vehicle, component identification module 232 may determine that the component is a valid component. Otherwise, component identification module 232 may determine that either the component is an invalid component or that the component was improperly installed.

In another instance, the operating characteristic may include an operating temperature for the component. For example, various portions of the engine (e.g., pistons, cranks, flywheels, the crankshaft, the oil, etc.) may be the particular component replaced or otherwise installed in the system. For the particular model of vehicle, the original equipment manufacturer may test the engine, gearbox, and/or oil temperature to create a model for how warm the engine, gearbox, and/or oil will get during normal operation when each component of the vehicle is installed correctly with a valid part. During the first driving cycle after the new component is detected, sensors 104 may monitor the engine, gearbox, and/or oil temperature throughout the driving cycle, sending the temperature information and the state of the vehicle when the temperature was measured (e.g., the current speed of the vehicle, the amount of time the vehicle has been operating in the current driving cycle, the outside temperature, the amount of stress exerted on the engine during the current driving cycle, etc.) to data collection module 230. Component identification module 232 may compare this temperature and state information to approved temperature/state combinations stored in the blockchain to verify that the vehicle is behaving as expected after the installation of the new component. If component identification module 232 determines that the temperature of the engine, gearbox, and/or oil is valid given the state of the vehicle, component identification module 232 may determine that the component is a valid component. Otherwise, component identification module 232 may determine that either the component is an invalid component or that the component was improperly installed. In other examples, the temperature may be measured when components in the exhaust system, the power train, or any other component that may have a different operating temperature when improperly installed are replaced.

In another instance, the operating characteristic may include an operating temperature for the device. For example, various portions of the vehicle's air conditioning unit may be the particular component replaced or otherwise installed in the system. For the particular model of vehicle, the original equipment manufacturer may measure the temperature inside of the cabin or of various components inside of the cabin (e.g., a user interface device) during normal operation when each component of the vehicle is installed correctly with a valid part. During the first driving cycle after the new component is detected in the air conditioning unit, sensors 104 may monitor the temperature inside of the cabin or of various components inside of the cabin throughout the driving cycle, sending the temperature information and the state of the vehicle when the temperature was measured (e.g., the outside temperature, the current settings of the air conditioner inside of the vehicle, the amount of time elapsed in the current driving cycle, the position of the windows of the vehicle, etc.) to data collection module 230. Component identification module 232 may compare this temperature and state information to approved temperature/state combinations stored in the blockchain to verify that the vehicle is behaving as expected after the installation of the new component. If component identification module 232 determines that the temperature inside of the cabin or of various components inside of the cabin is valid given the state of the vehicle, component identification module 232 may determine that the component is a valid component. Otherwise, component identification module 232 may determine that either the component is an invalid component or that the component was improperly installed.

In another instance, the operating characteristic may include a measurement of distance traveled by the device. For example, the wheels of the vehicle may be the particular component replaced or otherwise installed in the system. For the particular model of vehicle, the original equipment manufacturer may approve of certain dimensions for wheels installed on the vehicle. As such, for a known average speed and time elapsed in a driving cycle with a known dimension of wheel, the blockchain would include information to calculate an expected distance travelled if the wheel dimension for the newly installed component is consistent with the approved dimensions. During the first driving cycle after the new wheel is detected, sensors 104 may monitor the distance travelled by the vehicle throughout the driving cycle, sending the distance information and the state of the vehicle when the distance travelled was measured (e.g., the measured average speed of the vehicle throughout the driving cycle, the time elapsed in the driving cycle, etc.) to data collection module 230. Component identification module 232 may compare this distance and state information to approved distance/state combinations stored in the blockchain to verify that the vehicle is behaving as expected after the installation of the new component. If component identification module 232 determines that the distance travelled of the vehicle is consistent with the expected distance travelled given the state of the vehicle, component identification module 232 may determine that the component is a valid component. Otherwise, component identification module 232 may determine that either the component is an invalid component or that the component was improperly installed.

In another instance, the operating characteristic may include a sound of the component during operation. For example, various portions of the engine (e.g., pistons, cranks, flywheels, the crankshaft, the oil, etc.), the gearbox, or the exhaust system of the vehicle may be the particular component replaced or otherwise installed in the system. For parts that are deemed approved, the manufacturer of the component may include parts in the component, or construct certain parts of the component, that generate a particular sound (e.g., a sound with a particular pitch and at a particular decibel level under certain conditions) during the operation of the vehicle. Conversely, non-approved components may not be configured to generate such a sound, or the exact specifications of the component may not be disclosed to those manufacturers such that the non-approved manufacturers are unable to replicate the generated sound. For the particular model of vehicle, the original equipment manufacturer may measure the sound generated by the component during normal operation when the component of the vehicle is installed correctly with a valid part. During the first driving cycle after the new component is detected, sensors 104 may monitor the sound generated by the component throughout the driving cycle, sending the pitch and decibel information and the state of the vehicle when the sound was measured (e.g., the current speed, acceleration, gear, temperature, moisture level, RPMs of the crankshaft, etc.) to data collection module 230. Component identification module 232 may compare this sound and state information to approved sound/state combinations stored in the blockchain to verify that the vehicle is behaving as expected after the installation of the new component. If component identification module 232 determines that the sound generated by the component is consistent with the expected sound given the state of the vehicle, component identification module 232 may determine that the component is a valid component. Otherwise, component identification module 232 may determine that either the component is an invalid component or that the component was improperly installed.

For instance, sensors 104 may monitor an engine of the system. Component identification module 232 may determine, while the component is in operation and for each of a plurality of different revolutions per minute of the engine, a respective measurement of the operating characteristic. Component identification module 232 may then compare a combination of each revolutions per minute of the plurality of different revolutions per minute and the respective measurement of the operating characteristic to approved combinations of the operating characteristic at different revolutions per minute stored in the blockchain.

The operating characteristic may, additionally or alternatively, include a performance metric of the component. The performance metric may be any measurement related to a physical aspect of the device, such as gas mileage, towing capabilities, or a movement speed of particular automatic components of the vehicle (e.g., power windows, automatic doors, automatic trunk hatches, etc.), among other things. For example, when the performance metric is gas mileage, various portions of the engine (e.g., pistons, cranks, flywheels, the crankshaft, the oil, etc.), the gearbox, or the exhaust system of the vehicle may be the particular component replaced or otherwise installed in the system. For the particular model of vehicle, the original equipment manufacturer may generate a model for the expected gas mileage of the vehicle during normal operation when each component of the vehicle is installed correctly with a valid part. During the first driving cycle after the new component is detected, sensors 104 may monitor fuel level of the vehicle and the distance travelled by the vehicle throughout the driving cycle, sending the fuel level and distance information, along with the state of the vehicle when the fuel and distance were measured (e.g., the speeds, acceleration, gears, temperature, and RPMs of the crankshaft throughout the driving cycle, etc.) to data collection module 230. Component identification module 232 may compare this fuel, distance, and state information to approved fuel, distance, and state combinations stored in the blockchain to verify that the vehicle is behaving as expected after the installation of the new component. If component identification module 232 determines that the gas mileage for the vehicle is consistent with the expected gas mileage given the state of the vehicle, component identification module 232 may determine that the component is a valid component. Otherwise, component identification module 232 may determine that either the component is an invalid component or that the component was improperly installed.

The operating characteristic may, additionally or alternatively, include a rotational frequency of the component. For example, various portions of the engine (e.g., cranks, flywheels, the crankshaft, etc.), the gearbox, or any other operational component of the vehicle that may rotate during normal operation may be the particular component replaced or otherwise installed in the system. For parts that are deemed approved, the manufacturer of the component may include parts in the component, or construct certain parts of the component, that have a specific portion that is detectable separate from other portions of the component, such as a portion that is painted a different color, constructed of a different material, or have a different reflectivity than other portions of the component. Conversely, non-approved components may not be configured to have such a detectable portion, or the exact specifications of the component may not be disclosed to those manufacturers such that the non-approved manufacturers are unable to replicate the detectable portions of the components. For the particular model of vehicle, the original equipment manufacturer may measure the rotational frequency of the component by measuring a number of times the detectable portion of the component is detected (or a number of rotations) by sensors of the system during normal operation when the component of the vehicle is installed correctly with a valid part, and may measure this for a particular period of time. During the first driving cycle after the new component is detected, sensors 104 may monitor the rotational frequency of the component throughout period of time for the driving cycle, counting a number of instances the detectable portion of the component was detected throughout the duration of the driving cycle (or a number of rotations of the component) and sending the rotational frequency information and the state of the vehicle when the rotational frequency was measured (e.g., the speed, acceleration, and gear throughout the duration of the driving cycle, the amount of time elapsed in the driving cycle, the RPMs of the crankshaft, etc.) to data collection module 230. Component identification module 232 may compare the rotational frequency and state information to approved rotational frequency/state combinations stored in the blockchain to verify that the vehicle is behaving as expected after the installation of the new component. If component identification module 232 determines that the rotational frequency the component is consistent with the expected rotational frequency given the state of the vehicle, component identification module 232 may determine that the component is a valid component. Otherwise, component identification module 232 may determine that either the component is an invalid component or that the component was improperly installed.

The operating characteristic may, additionally or alternatively, include a vibration frequency of the component. For example, various portions of the engine, the gearbox, the exhaust system, or any other operational component of the vehicle that may vibrate during normal operation may be the particular component replaced or otherwise installed in the system. For parts that are deemed approved, the manufacturer of the component may include parts in the component, or construct certain parts of the component, that have a specific portion that is detectable separate from other portions of the component, such as a portion that is painted a different color, constructed of a different material, or have a different reflectivity than other portions of the component. Conversely, non-approved components may not be configured to have such a detectable portion, or the exact specifications of the component may not be disclosed to those manufacturers such that the non-approved manufacturers are unable to replicate the detectable portions of the components. For the particular model of vehicle, the original equipment manufacturer may measure the vibration frequency of the component by measuring a number of times the detectable portion of the component is detected by sensors of the system during normal operation when the component of the vehicle is installed correctly with a valid part. During the first driving cycle after the new component is detected, sensors 104 may monitor the vibration frequency of the component throughout the driving cycle, counting a number of instances the detectable portion of the component was detected throughout the duration of the driving cycle and sending the vibration frequency information and the state of the vehicle when the vibration frequency was measured (e.g., the speed, acceleration, and gear throughout the duration of the driving cycle, the amount of time elapsed in the driving cycle, the RPMs of the crankshaft, etc.) to data collection module 230. Component identification module 232 may compare the vibration frequency and state information to approved vibration frequency/state combinations stored in the blockchain to verify that the vehicle is behaving as expected after the installation of the new component. If component identification module 232 determines that the vibration frequency the component is consistent with the vibration frequency given the state of the vehicle, component identification module 232 may determine that the component is a valid component. Otherwise, component identification module 232 may determine that either the component is an invalid component or that the component was improperly installed.

The operating characteristic may, additionally or alternatively, include exhaust values of the device. For example, various portions of the engine (e.g., pistons, cranks, flywheels, the crankshaft, the oil, etc.) or the exhaust system may be the particular component replaced or otherwise installed in the system. For the particular model of vehicle, the original equipment manufacturer may test the exhaust values to create a model for how much exhaust will be produced and the particular chemical makeup of the exhaust produced during normal operation when each component of the vehicle is installed correctly with a valid part. During the first driving cycle after the new component is detected, sensors 104 may monitor the amount and chemical makeup of the exhaust throughout the driving cycle, sending the exhaust information and the state of the vehicle when the exhaust was analyzed (e.g., the current speed of the vehicle, the amount of time the vehicle has been operating in the current driving cycle, the outside temperature, the amount of stress exerted on the engine during the current driving cycle, etc.) to data collection module 230. Component identification module 232 may compare this exhaust and state information to approved exhaust/state combinations stored in the blockchain to verify that the vehicle is behaving as expected after the installation of the new component. If component identification module 232 determines that the exhaust levels and exhaust makeup is valid given the state of the vehicle, component identification module 232 may determine that the component is a valid component. Otherwise, component identification module 232 may determine that either the component is an invalid component or that the component was improperly installed.

The operating characteristic may, additionally or alternatively, include a software characteristic of the component or the device. The software characteristic may be any measurement related to a software aspect of the component, such as timing on the internal bus, bus responses, bus values, processing time for particular operations, software load times, and local variable values, among other things. For example, when the software characteristic is a software load time, various user interface systems (e.g., infotainment systems, dashboard systems, etc.) may be the particular component updated or otherwise installed in the system. For the particular model of vehicle, the original equipment manufacturer may generate a model for the expected load times of the particular user interface system during normal operation when each component of the vehicle is installed correctly with a valid software package. During the first driving cycle after the new software is detected, sensors 104 may track load times for various operations performed in the user interface system throughout the duration of the driving cycle, sending the load time information and the state of the vehicle when the load times were measured (e.g., the temperature of the hardware performing the software operations, a number of other operations being performed by the hardware, etc.) to data collection module 230. Component identification module 232 may compare this load time and state information to approved load time and state combinations stored in the blockchain to verify that the vehicle is behaving as expected after the installation of the new component. If component identification module 232 determines that the load times for the vehicle are consistent with the expected load times given the state of the vehicle, component identification module 232 may determine that the component is a valid component. Otherwise, component identification module 232 may determine that either the component is an invalid component or that the component was improperly installed.

The operating characteristic may, additionally or alternatively, include a torque generated by the component. For example, various portions of the engine (e.g., pistons, cranks, flywheels, the crankshaft, the oil, etc.) may be the particular component replaced or otherwise installed in the system. For the particular model of vehicle, the original equipment manufacturer may test the torque generated by the component in different conditions to create a model for how much torque should be expected during normal operation when each component of the vehicle is installed correctly with a valid part. During the first driving cycle after the new component is detected, sensors 104 may monitor the torque generated by the component throughout the driving cycle, sending the torque information and the state of the vehicle when the torque was measured (e.g., the current speed of the vehicle, the amount of time the vehicle has been operating in the current driving cycle, the outside temperature, the amount of stress exerted on the engine during the current driving cycle, the RPMs of the crankshaft, etc.) to data collection module 230. Component identification module 232 may compare this torque and state information to approved torque/state combinations stored in the blockchain to verify that the vehicle is behaving as expected after the installation of the new component. If component identification module 232 determines that the torque measurements are valid given the state of the vehicle, component identification module 232 may determine that the component is a valid component. Otherwise, component identification module 232 may determine that either the component is an invalid component or that the component was improperly installed.

In some examples, multiple blockchains may be stored in blockchain ledger data 252 and throughout the peer-to-peer network that includes computing device 202 (or the system on which computing device 202 is integrated). In some instances, the multiple blockchains may be different blockchains of approved operating characteristics with each blockchain corresponding to a particular type of component of the system that may be replaced, added, or otherwise installed. In some instances, blockchain ledger data 252 may further include a blockchain that includes explicitly disapproved operating characteristics of different types of components. For example, component identification module 232 may determine, in response to detecting an installation of a second component for the system, an operating characteristic of the second component based on sensor signal data 250 received from sensors 104. Component identification module 232 may then detect, based at least in part on a comparison of the operating characteristic of the second component and a disapproved operating characteristic for the second component stored in a second blockchain, that the component is a disapproved component for the system.

In some instances, component identification module 232 may output a notification indicative of the disapproved component in response to detecting that the component is the disapproved component for the system. For instance, component identification module 232 may output, on a display device operatively connected to the system, a textual or graphical indication of the disapproved component or invalid installation of the component. In other instances, component identification module 232 may leverage communication units 206 to send one of a text message or an email to an account corresponding to a user of the vehicle with the notification of the disapproved component. In still other instance, component identification module 232 may send the notification to the original equipment manufacturer of system, as the disapproved component may alter a warranty status of the system.

Figure 3:
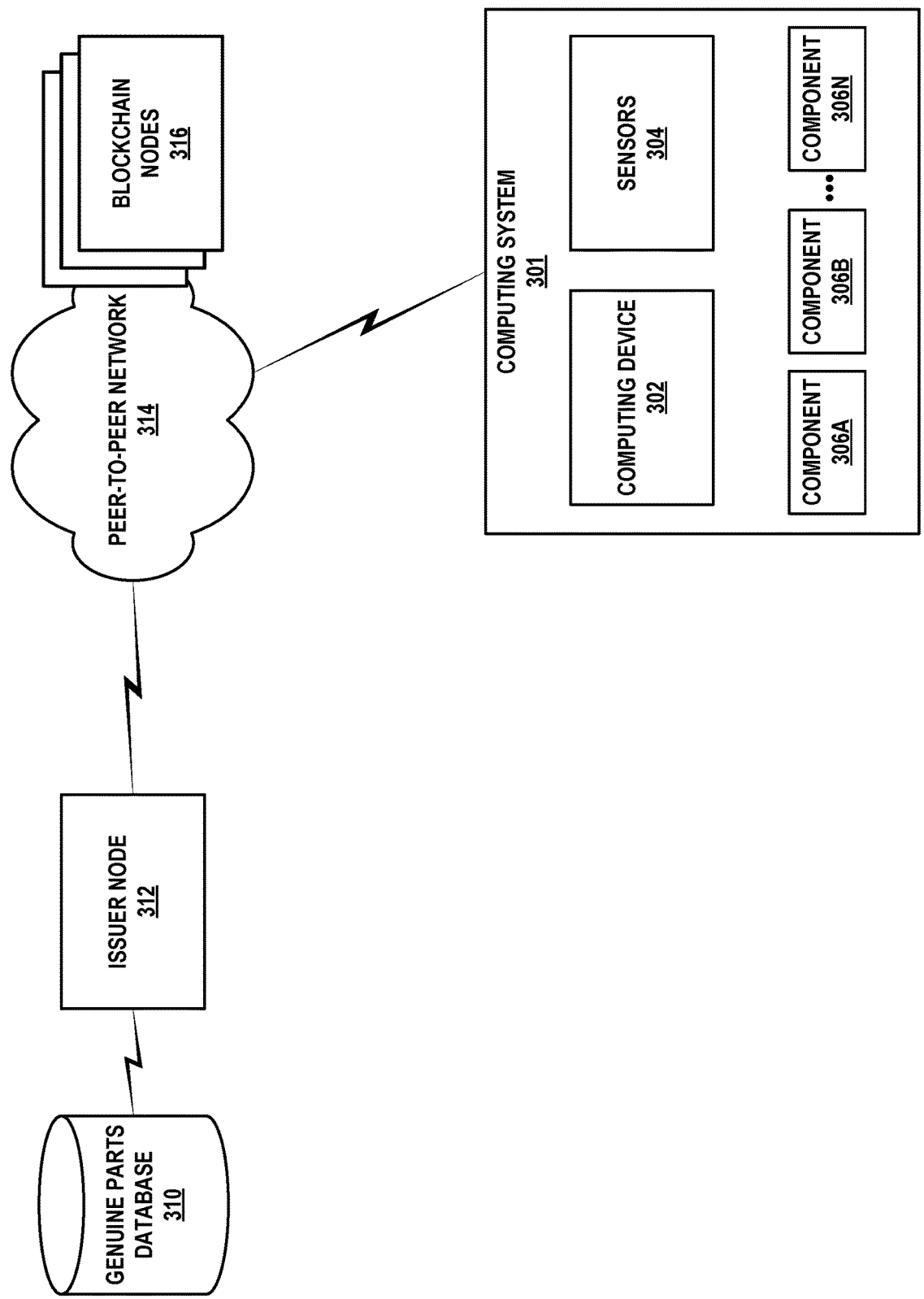
FIG. 3 is a conceptual diagram illustrating a system in which a computing system accesses a blockchain stored throughout a peer-to-peer network in accordance with various aspects of the component verification techniques described in this disclosure.

FIG. 3 is a conceptual diagram illustrating a system in which a computing system is able to access a blockchain stored throughout a peer-to-peer network in order to perform the component verification techniques described in this disclosure. As shown in the example of FIG. 3, the system includes computing system 301, genuine parts database 310, issuer node 312, peer-to-peer network 314, and one or more blockchain nodes 316.

The techniques described herein include a method to ensure that components 306A-306N (collectively, components 306) are properly installed in computing system 301 and that components 306 installed in the vehicle are valid parts for use in computing system 301. In this system, there may be multiple blockchain nodes 316, which may include servers, a computing device connected to a server, vehicles, or specific computer systems within vehicles. When issuer node 312 (e.g., a device owned by the original equipment manufacturer of computing system 301) updates genuine parts database 310 to add a component that can validly be installed in computing system 301 (e.g., by adding characteristics that show an allowable characteristic for a quality component), issuer node 312 may update a blockchain stored throughout blockchain nodes 316 of the system to store one or more characteristics or range of characteristics of the valid component. Eventually, through peer-to-peer communication over peer-to-peer network 314, the ledger of the blockchain stored on computing system 301 may also update to show the characteristic of the valid part. Whenever a new component is installed in computing system 301, a process may be triggered within computing device 302 to leverage sensors 304 to measure one or more characteristics of the new component that was installed in computing system 301. If the measured characteristics of the part match the characteristics for a valid part stored in the blockchain, then computing system 301 may approve the installation as a valid installation. Conversely, if the measured characteristics of the component do not match the characteristics stored in the blockchain, or if the measured characteristics of the component match characteristics stored in a second blockchain containing characteristics of components explicitly not approved by issuer node 312, computing system 301 may output a warning that the component was either installed incorrectly or that the part is not an approved part. Computing system 301 may output this warning directly to the owner of the vehicle, or to issuer node 312.

Sensors 304 may measure any of a variety of things as the one or more characteristics for a valid component, including accelerometer data for any of components 306, accelerometer data for computing system 301, an operating temperature for any of components 306, an operating temperature for computing system 301, a measurement of distance traveled by computing system 301, a sound of any of components 306 during operation, a performance metric of component 106, a rotational frequency of any of components 306, a vibration frequency of any of components 306, exhaust values of computing system 301, a software characteristic of any of components 306 (e.g., variable values, timing, response values, etc.), a software characteristic of computing system 301, or a torque generated by any of components 306. For instance, in examples where computing system 301 is a vehicle, a temperature sensor and/or bus data can monitor oil characteristics in the engine and gearbox. The temperature sensor can also monitor engine heat characteristics. For rotating components of components 306 of any computing system example of computing system 301, sensors 304 can monitor detectable portions of the rotating part to determine a detectable frequency of rotations of the part. A vibration sensor can measure speed characteristics and monitor characteristics of computing system 301 from its sound and/or torque at different revolution frequencies.

In these examples, only issuer node 312 or the original equipment manufacturer itself may add parts and characteristics to genuine parts database 310, and thereby updating the ledger of the corresponding, explicitly trusted blockchain, as well as the explicitly untrusted blockchain (if such a blockchain exists in the particular system). The blockchain, in this example, could be compared to genuine parts database 310 that holds all of the confirmed characteristics and ranges. These characteristics are then easily verified/validated by issuer node 312, while also giving issuer node 312 the opportunity to quickly update the blockchain with additional components and/or characteristics. Each block added to the blockchain may include only the updated portions of genuine parts database 310, or may include the currently verified quality parts list for a particular type of component.

In accordance with the techniques described herein, issuer node 312 may create and update one of more blockchains, to be stored on computing system 301 and each of blockchain nodes 316 in peer-to-peer network 314, using information in genuine parts database 310. In some instances, a single blockchain may include the approved characteristics for all types of components 306 stored in genuine parts database. In other instances, issuer node 312 may create multiple blockchains (e.g., N blockchains), each blockchain storing approved characteristics for a particular type of component of components 306 (e.g., one blockchain storing approved characteristics of components having a same type as component 306A, a second blockchain storing approved characteristics components having a same type as component 306B, etc.). In still other instances, for each blockchain of approved characteristics for one or more types of components, issuer node 312 may create a corresponding blockchain of explicitly disapproved characteristics for the respective one or more types of components of components 306.

Each blockchain may include singular values and/or ranges of values as the approved and/or disapproved characteristics for components 306. When issuer node 312 only creates blockchains that include approved characteristics, computing device 302 may treat any operating characteristic outside of the value or range of values in the approved characteristics as an invalid characteristic. When issuer node 312 creates blockchains of both approved and disapproved characteristics, if computing device 302 detects an operating characteristic outside of both the approved and disapproved characteristics, computing device 302 may either treat the operating characteristic as intrinsically invalid or as a neutral component that must be re-tested during a future driving cycle. If computing device 302 treats the operating characteristic neutrally, computing device 302 may generate and output a notification indicating as such.

Figure 4:
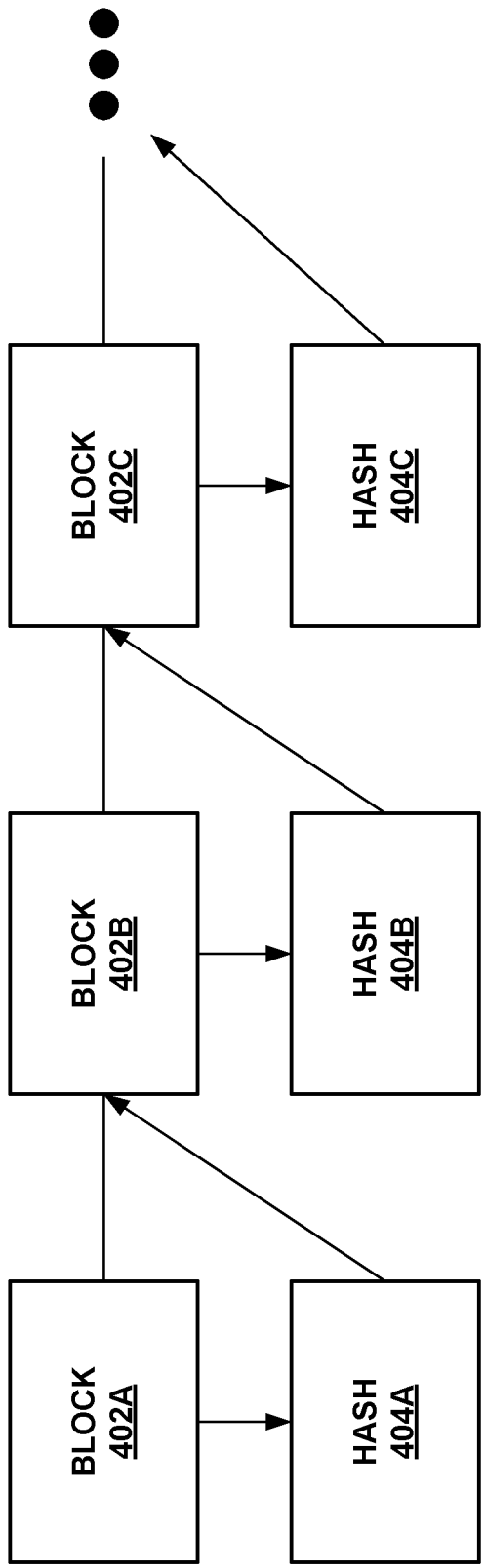
FIG. 4 is a conceptual diagram illustrating an approved operating characteristic blockchain in accordance with various aspects of the component verification techniques described in this disclosure.

FIG. 4 is a conceptual diagram illustrating an approved operating characteristic blockchain in accordance with various aspects of the component verification techniques described in this disclosure. A blockchain is a series of blocks (e.g., blocks 402A-402C (collectively, "blocks 402")) that are linked to one another using cryptography, such as a hash function. Each block of the blockchain includes a hashed version of the previous block of the blockchain, a timestamp of the update to the blockchain, the new information for the blockchain, and, potentially, additional information about the transaction adding the new information, such as a user identification or some other sort of metadata.

As shown in FIG. 4, block 402A may be a first block in a blockchain that includes approved operating characteristics for one or more types of components of a system that stores the blockchain. An issuer node, such as issuer node 312 of FIG. 3, may produce a transaction, or an update to the blockchain with updated approved operating characteristics for the one or more components. To store this new information, the issuer node would first create hash block 404A by applying a hash function (or other cryptographic function) to block 402A. The issuer node may then append the new information to hash block 404A, thereby creating block 402B. The issuer node may then disperse block 402B over a peer-to-peer network to any nodes connected to the issuer node, and those nodes may continue the dissemination of block 402B until each node configured to store the blockchain has a copy of block 402B stored in its local memory.

At later time, the issuer node may produce another transaction to update the blockchain again with updated approved operating characteristics for the one or more components. To store this new information, the issuer node would first create hash block 404B by applying a hash function (or other cryptographic function) to block 402B, which includes the first set of updated information and hash block 404A of block 402A. The issuer node may then append the new information to hash block 404B, thereby creating block 402C. The issuer node may then disperse block 402C over the peer-to-peer network to any nodes connected to the issuer node, and those nodes may continue the dissemination of block 402C until each node configured to store the blockchain has a copy of block 402C stored in its local memory. This process may continue as additional blocks are added to the blockchain, such as with the addition of hash block 404C to create a new block in the blockchain. Furthermore, each type of component may include a similarly structured blockchain (e.g., one blockchain for approved characteristics of each respective type of component).

Figure 5:
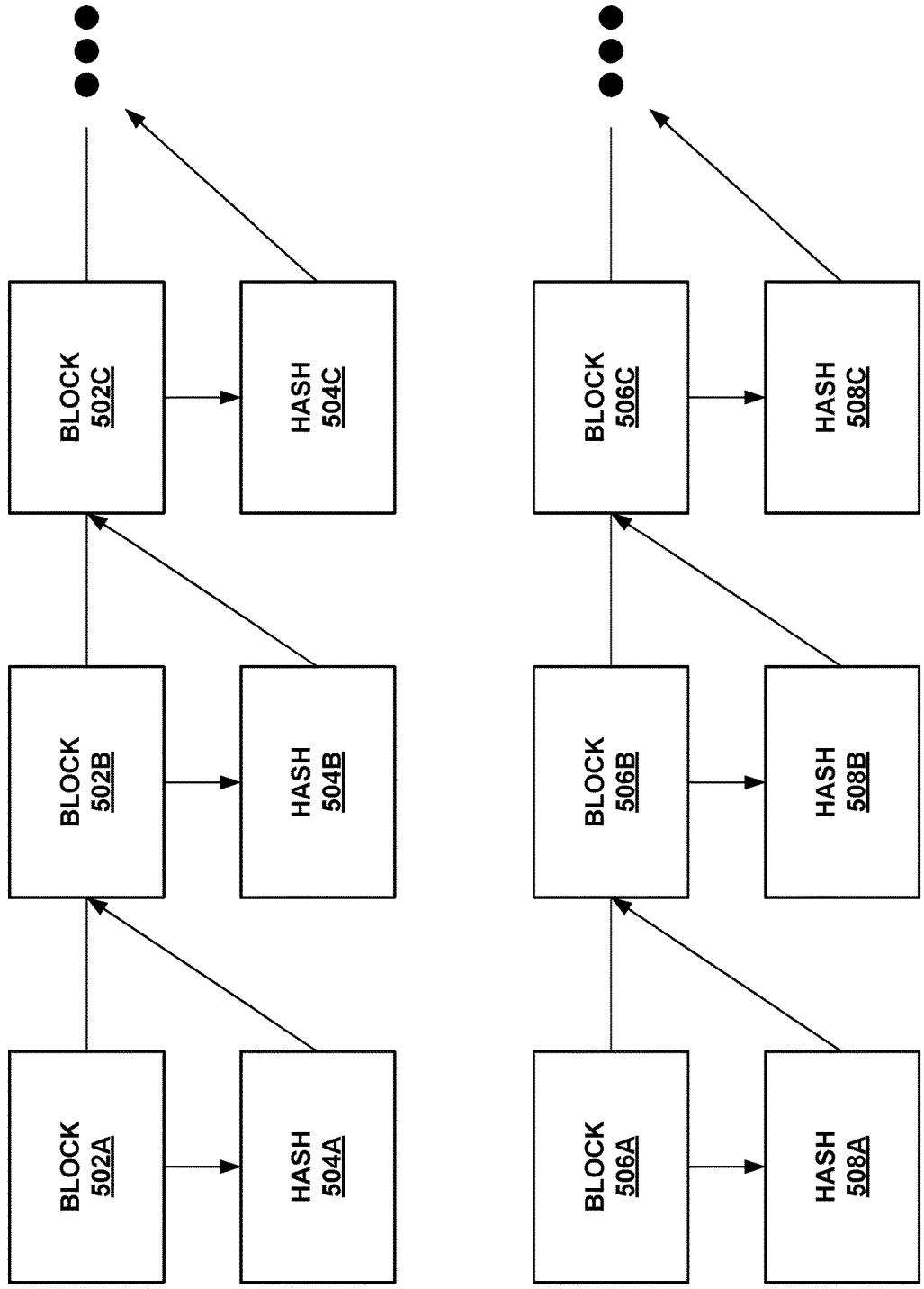
FIG. 5 is a conceptual diagram illustrating a dual-blockchain system that includes an approved operating characteristic blockchain and a disapproved operating characteristic blockchain in accordance with various aspects of the component verification techniques described in this disclosure.

FIG. 5 is a conceptual diagram illustrating a dual-blockchain system that includes an approved operating characteristic blockchain and a disapproved operating characteristic blockchain in accordance with various aspects of the component verification techniques described in this disclosure. In the example of FIG. 5, a first blockchain of approved operating characteristics for a first type of component is represented by blocks 502A-502C and hash blocks 504A-504C. Further, the issuer node may create a blockchain of disapproved operating characteristics for the first type of component, which is represented by blocks 506A-506C and hash blocks 508A-508C in the example of FIG. 5. The issuer node may create, update, and disseminate each of the blockchains in a similar manner to the manner discussed above with respect to FIG. 4. Furthermore, each type of component may include a similarly structured pair of blockchains (e.g., one for approved characteristics of the respective type of component, and one for disapproved characteristics of the respective type of component).

Figure 6:
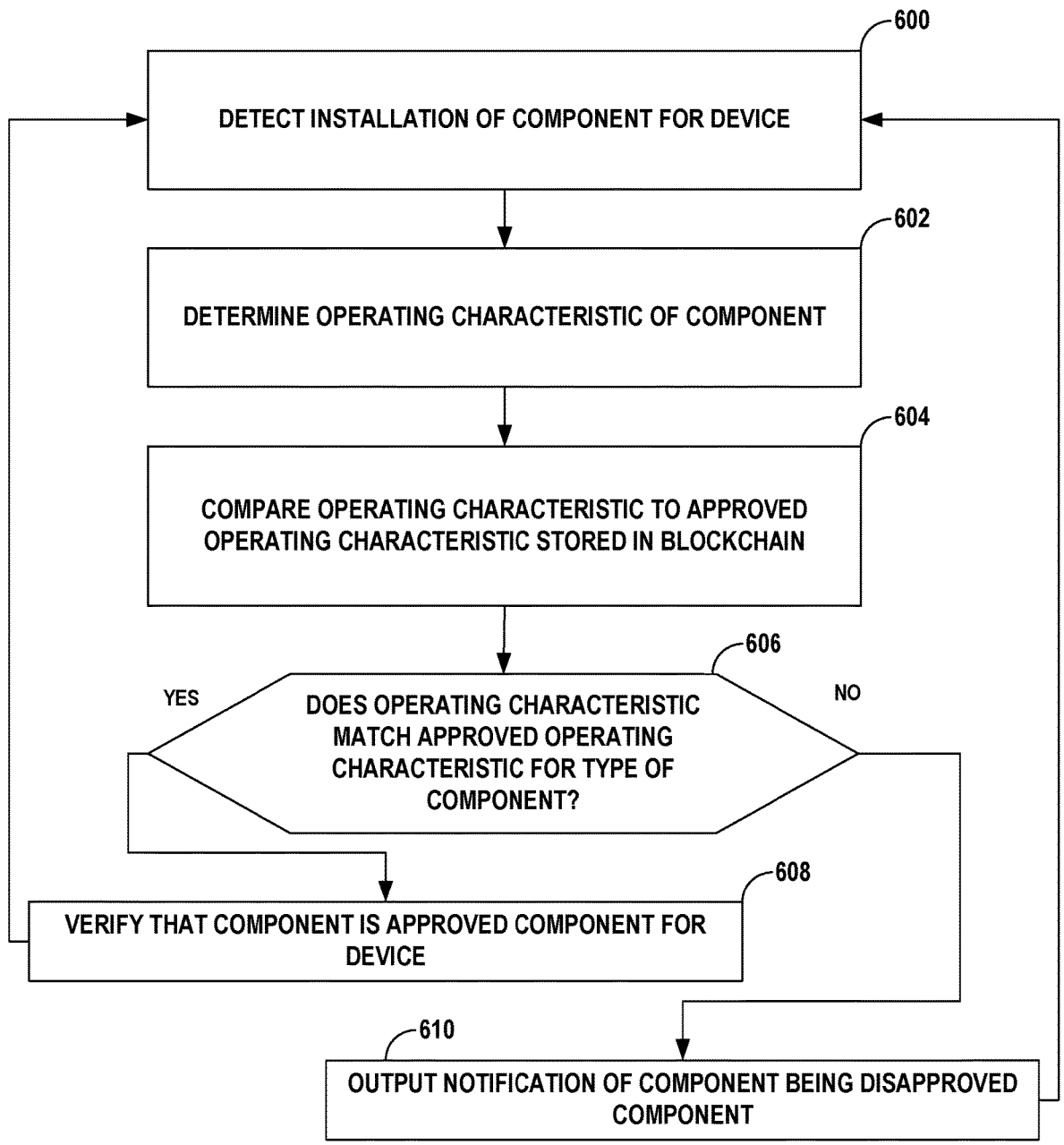
FIG. 6 is a flowchart illustrating example operation of the computing system shown in the example of FIG. 2 in performing various aspects of the component verification techniques described in this disclosure.

FIG. 6 is a flowchart illustrating example operation of the computing system shown in the example of FIG. 2 in performing various aspects of the component verification techniques described in this disclosure. Computing device 202 may first invoke component identification module 232 to interface with electronic control units (ECUs) 220 to detect that a new component has been installed in a device (e.g., vehicle 101 or computing system 301) (600). Computing device 202 may then invoke data collection module 230 to interface with ECUs 220 to obtain sensor signal data 250 from sensors 104 such that component identification module 232 may determine an operating characteristic of the component in vehicle 101 or computing system 301 (602). Data collection module 230 may store the sensor signal data 250.

Component identification module 232 may compare the operating characteristic of the newly installed component with an approved operating characteristic stored in a blockchain throughout a peer-to-peer network (604). Based on this comparison, component identification module 232 may determine whether the operating characteristic matches the approved operating characteristic, such as by determining if the operating characteristic is equal to or falls within an approved range for that type of component as defined in the blockchain (606). If component identification module 232 validates the component ("YES" branch of 606), component identification module 232 may verify that the component is an approved component for the device (608). Conversely, if component identification module 232 invalidates the component ("NO" branch of 606), component identification module 232 may output a notification, to an output device visible to a user of vehicle 101 or computing system 301 or to the original manufacturer of vehicle 101 or computing system 301, indicating that the component is a disapproved component (610). Computing device 202 may continue to operate in this manner (600-610) to perform real-time or near-real-time component verification (which is another way to refer to various aspects of the component verification techniques described in this disclosure).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fibre optic cable, twisted pair, digital subscriber line (DSL), or wireless technologies such as infrared, radio, and microwave, then the coaxial cable, fibre optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A device comprising:
one or more sensors installed in a vehicle and configured to capture measurements corresponding to the vehicle in operation; and
one or more processors implemented in circuitry operating as a node in a blockchain system that includes an issuer node, wherein the node is part of a peer-to-peer network configured to store at least a portion of a ledger of the blockchain, and configured to maintain up-to-date approved component characteristics in the portion of the ledger through cryptographic communication with other nodes of the peer-to-peer network, the one or more processors in communication with the one or more sensors and configured to:
detect installation of a vehicle component;
determine, in response to detecting the installation of the vehicle component, an operating characteristic of the vehicle component based on the captured measurements determined while the vehicle component is in operation;
monitor an engine of the vehicle;
determine, while the vehicle component is in operation and for each of a plurality of different revolutions per minute of the engine, a respective measurement of the operating characteristic of the vehicle component;
compare a combination of each revolutions per minute of the plurality of different revolutions per minute and the respective measurement of the operating characteristic of the vehicle component to approved combinations of the operating characteristic of the vehicle component at different revolutions per minute stored in the approved component characteristics in the portion of the ledger of the blockchain for a corresponding component type;
determine, based at least in part on the comparison, that the vehicle component is an approved component for the vehicle, wherein the issuer node is configured to add, to a most recent block of the blockchain, an up-to-date version of an approved operating characteristic of the vehicle component in response to an update by an original equipment manufacturer of the vehicle, wherein to add the up-to-date version of the approved operating characteristic the issuer node is configured to create a hash block by applying a hash function to an existing block in the blockchain and append the up-to-date operating characteristic to the hash block to create the most recent block of the blockchain; and
output, based on the determination that the vehicle component is the approved component for the vehicle, a notification to a display device of the vehicle.

2. The device of claim 1, wherein the operating characteristic measured by the one or more sensors comprises one or more of accelerometer data for the vehicle component, accelerometer data for the vehicle, an operating temperature for the vehicle component, an operating temperature for the vehicle, a measurement of distance traveled by the vehicle, a sound of the vehicle component during operation, a performance metric of the vehicle component, a rotational frequency of the vehicle component, a vibration frequency of the vehicle component, exhaust values of the vehicle, a software characteristic of the vehicle component, a software characteristic of the vehicle, or a torque generated by the vehicle component.

3. The device of claim 2, wherein the operating characteristic for the vehicle component comprises the rotational frequency of the vehicle component, and wherein to determine the operating characteristic of the vehicle component the one or more processors are configured to:
determine, while the vehicle component is in operation, a number of rotations of the vehicle component over a particular period of time; and
determine, based at least in part on the number of rotations of the vehicle component and the particular period of time, the rotational frequency of the vehicle component.

4. The device of claim 2, wherein the operating characteristic of the vehicle component comprises the operating temperature of the vehicle component, and wherein to determine the operating characteristic of the vehicle component the one or more processors are configured to:
monitor an oil temperature in one of the engine of the vehicle or a gearbox of the vehicle; and
compare the oil temperature of the engine or the oil temperature of the gearbox to an approved oil temperature stored in the blockchain.

5. The device of claim 1, wherein the blockchain comprises a first blockchain of approved operating characteristics, wherein the vehicle component comprises a first component, and wherein the one or more processors are further configured to:
determine, in response to detecting an installation of a second component for the vehicle, an operating characteristic of the second component; and
detect, based at least in part on a comparison of the operating characteristic of the second component and a disapproved operating characteristic for the second component stored in a second blockchain, that the second component is a disapproved component for the vehicle.

6. The device of claim 1, wherein the vehicle component comprises a first component, and wherein the one or more processors are further configured to:
determine, in response to detecting an installation of a second component for the vehicle, an operating characteristic of the second component; and
detect, based at least in part on a comparison of the operating characteristic of the second component and an approved operating characteristic for the second component stored in the blockchain, that the second component is a disapproved component for the vehicle.

7. The device of claim 6, wherein the one or more processors are further configured to:
  output, in response to detecting that the second component is the disapproved component for the vehicle, a notification indicative of at least one of the disapproved component or an action to install a different component that is of a quality that has been certified by the original equipment manufacturer.

8. The device of claim 6, wherein the one or more processors are further configured to:
  output, by the one or more processors and in response to detecting that the second component is the disapproved component for the vehicle, a notification indicative of the disapproved component to the original equipment manufacturer of the device to determine a warranty status of the device.

9. The device of claim 1, wherein the device comprises the vehicle.

10. A device operating as a node in a blockchain system that includes an issuer node, wherein the node is part of a peer-to-peer network configured to store at least a portion of a ledger of the blockchain, and configured to maintain up-to-date approved component characteristics in the portion of the ledger through cryptographic communication with other nodes of the peer-to-peer network, the device comprising:
  means for detecting an installation of a component for a vehicle;
  means for determining, in response to detecting the installation of the component, an operating characteristic of the component based on measurements captured by one or more sensors installed in the vehicle while the vehicle is operating;
  means for monitoring an engine of the vehicle;
  means for determining, while the component is in operation and for each of a plurality of different revolutions per minute of the engine, a respective measurement of the operating characteristic; and
  means for comparing a combination of each revolutions per minute of the plurality of different revolutions per minute and the respective measurement of the operating characteristic to approved combinations of the operating characteristic at different revolutions per minute stored in the approved component characteristics in the portion of the ledger of the blockchain for a corresponding component type;
  means for determining, based at least in part on the comparison, that the component is an approved component for the vehicle, wherein the issuer node is configured to add, to a most recent block of the blockchain, an up-to-date version of an approved operating characteristic in response to an update by an original equipment manufacturer of the vehicle, wherein to add the up-to-date version of the approved operating characteristic the issuer node is configured to create a hash block by applying a hash function to an existing block in the blockchain and append the up-to-date operating characteristic to the hash block to create the most recent block of the blockchain; and
  means for outputting based on the determination that the component is the approved component for the vehicle, a notification to a display device of the vehicle.

11. A method performed by one or more processors implemented in circuitry operating as a node in a blockchain system that includes an issuer node, wherein the node is part of a peer-to-peer network configured to store at least a portion of a ledger of the blockchain, and configured to maintain up-to-date approved component characteristics in the portion of the ledger through cryptographic communication with other nodes of the peer-to-peer network, the method comprising:
  detecting, by the one or more processors, an installation of a component for a vehicle;
  determining, by the one or more processors and in response to detecting the installation of the component, an operating characteristic of the component based on measurements corresponding to the vehicle in operation captured by one or more sensors installed in the vehicle;
  monitoring, by the one or more processors, an engine of the vehicle;
  determining, by the one or more processors, while the component is in operation, and for each of a plurality of different revolutions per minute of the engine, a respective measurement of the operating characteristic; and
  comparing, by the one or more processors, a combination of each revolutions per minute of the plurality of different revolutions per minute and the respective measurement of the operating characteristic to approved combinations of the operating characteristic at different revolutions per minute stored in the approved component characteristics in the portion of the ledger of the blockchain for a corresponding component type;
  determining, by the one or more processors and based at least in part on the comparison, that the component is an approved component for the vehicle, wherein the issuer node is configured to add, to a most recent block of the blockchain, an up-to-date version of an approved operating characteristic in response to an update by an original equipment manufacturer of the vehicle, wherein to add the up-to-date version of the approved operating characteristic the issuer node is configured to create a hash block by applying a hash function to an existing block in the blockchain and append the up-to-date operating characteristic to the hash block to create the most recent block of the blockchain; and
  outputting, by the one or more processors and based on the determination that the component is the approved component for the vehicle, a notification to a display device of the vehicle.

12. The method of claim 11, wherein the operating characteristic comprises one or more of accelerometer data for the component, accelerometer data for the vehicle, an operating temperature for the component, an operating temperature for the vehicle, a measurement of distance traveled by the vehicle, a sound of the component during operation, a performance metric of the component, a rotational frequency of the component, a vibration frequency of the component, exhaust values of the vehicle, a software characteristic of the component, a software characteristic of the vehicle, or a torque generated by the component.

13. The method of claim 12, wherein the operating characteristic comprises the rotational frequency of the component, and wherein determining the operating characteristic of the component comprises:
  determining, by the one or more processors, while the component is in operation, a number of rotations of the component over a particular period of time; and
  determining, by the one or more processors, and based at least in part on the number of rotations of the component and the particular period of time, the rotational frequency of the component.

14. The method of claim 12, wherein the operating characteristic comprises the operating temperature of the component, and wherein determining the operating characteristic of the component comprises:
- monitoring, by the one or more processors, an oil temperature in one of the engine of the vehicle or a gearbox of the vehicle; and
- comparing, by the one or more processors, the oil temperature of the engine or the oil temperature of the gearbox to an approved oil temperature stored in the blockchain.

15. The method of claim 11, wherein the blockchain comprises a first blockchain of approved operating characteristics, wherein the component comprises a first component, and wherein the method further comprises:
- determining, by the one or more processors, and in response to detecting an installation of a second component for the vehicle, an operating characteristic of the second component; and
- detecting, by the one or more processors, and based at least in part on a comparison of the operating characteristic of the second component and a disapproved operating characteristic for the second component stored in a second blockchain, that the component is a disapproved component for the vehicle.

16. The method of claim 11, wherein the component comprises a first component, and wherein the method further comprises:
- determining, by the one or more processors, and in response to detecting an installation of a second component for the vehicle, an operating characteristic of the second component; and
- detecting, by the one or more processors, and based at least in part on a comparison of the operating characteristic of the second component and an approved operating characteristic for the second component stored in the blockchain, that the component is a disapproved component for the vehicle.

17. The method of claim 16, wherein the method further comprises:
- outputting, by the one or more processors, and in response to detecting that the component is the disapproved component for the vehicle, a notification indicative of at least one of the disapproved component or an action to install hardware or software that is of a quality that has been certified by the original equipment manufacturer.

18. The method of claim 16, wherein the method further comprises:
- determining, by the one or more processors, and in response to detecting that the component is the disapproved component for the vehicle, that the component is an invalid component or that the component was improperly installed.

* * * * *